United States Patent
Jung et al.

(10) Patent No.: US 10,793,029 B2
(45) Date of Patent: Oct. 6, 2020

(54) MULTI-JOINT SEAT BACK FOR VEHICLE

(71) Applicants: Hyundai Motor Company, Seoul (KR); KIA Motors Corporation, Seoul (KR)

(72) Inventors: Chan Ho Jung, Gunpo-si (KR); Gil Ju Kim, Seoul (KR); Seong Mun Yun, Hwaseong-si (KR); Seon Chae Na, Yongin-si (KR); Ju Yeol Kong, Ansan-si (KR); Mu Young Kim, Hwaseong-si (KR); Hyung Jin Park, Seoul (KR); Sang Uk Yu, Seoul (KR); Hyun Kyu Moon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/439,255

(22) Filed: Jun. 12, 2019

(65) Prior Publication Data
US 2020/0164773 A1 May 28, 2020

(30) Foreign Application Priority Data
Nov. 26, 2018 (KR) .......................... 10-2018-0146974

(51) Int. Cl.
*B60N 2/02* (2006.01)
*B60N 2/68* (2006.01)
(Continued)

(52) U.S. Cl.
CPC ......... *B60N 2/2222* (2013.01); *B60N 2/0232* (2013.01); *B60N 2/643* (2013.01); *B60N 2/68* (2013.01); *B60N 2205/35* (2013.01)

(58) Field of Classification Search
CPC .... B60N 2/2222; B60N 2/0232; B60N 2/643; B60N 2/68; B60N 2205/35
(Continued)

(56) References Cited

U.S. PATENT DOCUMENTS 3,112,137 A * 11/1963 Drenth .................. A47C 7/405
297/284.3
3,565,482 A * 2/1971 Blodee ..................... A47C 7/14
297/284.3
(Continued)

FOREIGN PATENT DOCUMENTS

DE           10152561 A1 *  5/2003  .............. B60N 2/66
DE       102014001654 A1 *  8/2014  ............. B60N 2/643
(Continued)

*Primary Examiner* — Rodney B White
(74) *Attorney, Agent, or Firm* — Brinks Gilson & Lione

(57) ABSTRACT

The present disclosure provides a multi-joint seat back for a vehicle, which may include a plurality of partitioned seat back components provided to have a structure in which a seat pad is inserted into a front portion of a skeletal frame and configured to be hinged to one another in a manner of rotating angularly in a forward or backward direction; elastic wires, each of which is connected between two partitioned seat back components selected from the plurality of partitioned seat back components; pulling wires bound to predetermined positions of the elastic wires respectively; and a drive unit connected to the pulling wires such that it winds the pulling wires to pull the elastic wires or otherwise releases the pulling wires to restore the elastic wires.

6 Claims, 9 Drawing Sheets

(51) Int. Cl.
  *B60N 2/22* (2006.01)
  *B60N 2/64* (2006.01)
(58) Field of Classification Search
  USPC .................................................... 297/284.3
  See application file for complete search history.

(56) References Cited

U.S. PATENT DOCUMENTS

| | | | | | |
|---|---|---|---|---|---|
| 3,877,750 | A * | 4/1975 | Scholpp | ............... | A47C 1/143 |
| | | | | | 297/284.3 |
| 4,585,272 | A * | 4/1986 | Ballarini | ............... | A47C 3/12 |
| | | | | | 297/284.3 |
| 5,062,676 | A * | 11/1991 | Mars | ............... | A47C 1/022 |
| | | | | | 297/284.3 |
| 5,228,747 | A * | 7/1993 | Greene | ............... | A61G 5/00 |
| | | | | | 297/284.3 |
| 5,975,641 | A * | 11/1999 | Delesie | ............... | A47C 7/024 |
| | | | | | 297/284.3 |
| 6,609,754 | B2 * | 8/2003 | Rajasingham | ......... | B62D 21/15 |
| | | | | | 297/284.3 |
| 6,820,933 | B2 * | 11/2004 | Fereira Da Silva | ... | B60N 2/666 |
| | | | | | 297/284.1 |
| 7,909,402 | B2 * | 3/2011 | Chu | ............... | A47C 7/405 |
| | | | | | 297/284.3 X |
| 8,939,507 | B2 * | 1/2015 | Thomaschewski | .... | B60N 2/643 |
| | | | | | 297/284.3 X |
| 2004/0195882 | A1 * | 10/2004 | White | ............... | A47C 4/02 |
| | | | | | 297/284.3 |
| 2004/0256899 | A1 * | 12/2004 | Moore | ............... | A61F 5/024 |
| | | | | | 297/284.3 |
| 2006/0255635 | A1 * | 11/2006 | Iijima | ............... | A47C 7/46 |
| | | | | | 297/284.3 |
| 2013/0127219 | A1 * | 5/2013 | Gerwig | ............... | A47C 1/03261 |
| | | | | | 297/284.3 |
| 2014/0159450 | A1 * | 6/2014 | Guering | ............... | B60N 2/643 |
| | | | | | 297/284.3 |
| 2014/0167464 | A1 * | 6/2014 | Kordyl | ............... | A61G 5/122 |
| | | | | | 297/284.3 |
| 2016/0236601 | A1 * | 8/2016 | Dry | ............... | B60N 2/914 |
| 2019/0255976 | A1 * | 8/2019 | Katoh | ............... | B60N 2/544 |
| 2020/0114795 | A1 * | 4/2020 | Nagai | ............... | B60N 2/06 |
| 2020/0139864 | A1 * | 5/2020 | Susko | ............... | A47C 7/14 |

FOREIGN PATENT DOCUMENTS

| | | | | |
|---|---|---|---|---|
| DE | 102015207841 A1 * | 11/2015 | ....... | B60R 21/23138 |
| DE | 202018103549 U1 * | 9/2018 | ............ | B60N 2/643 |
| DE | 102018115124 A1 * | 12/2019 | ............ | B60N 2/643 |
| JP | 2014057623 A * | 4/2014 | ............ | B60N 2/39 |

* cited by examiner

[FIG. 1]
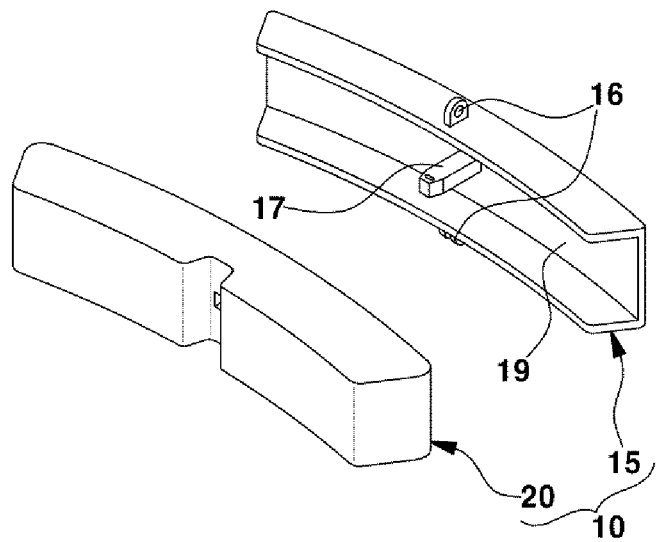
[FIG. 2A]
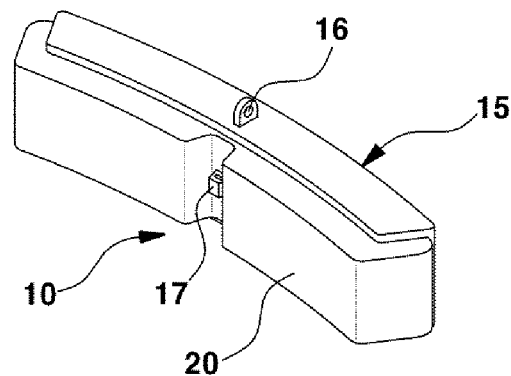
[FIG. 2B]
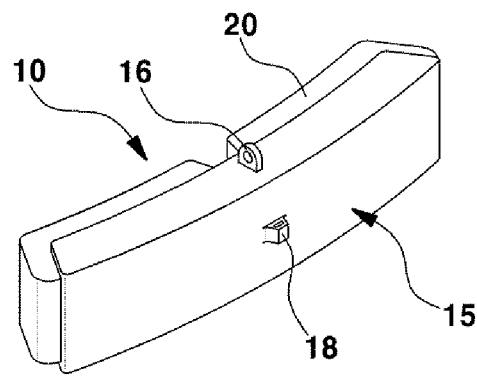

[FIG. 3]
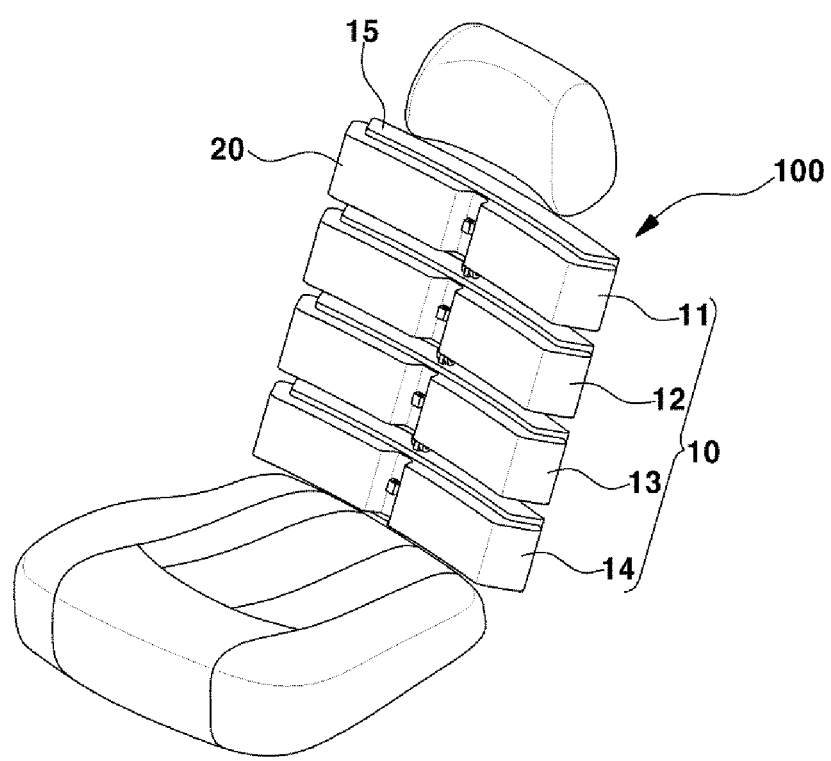

[FIG. 4]
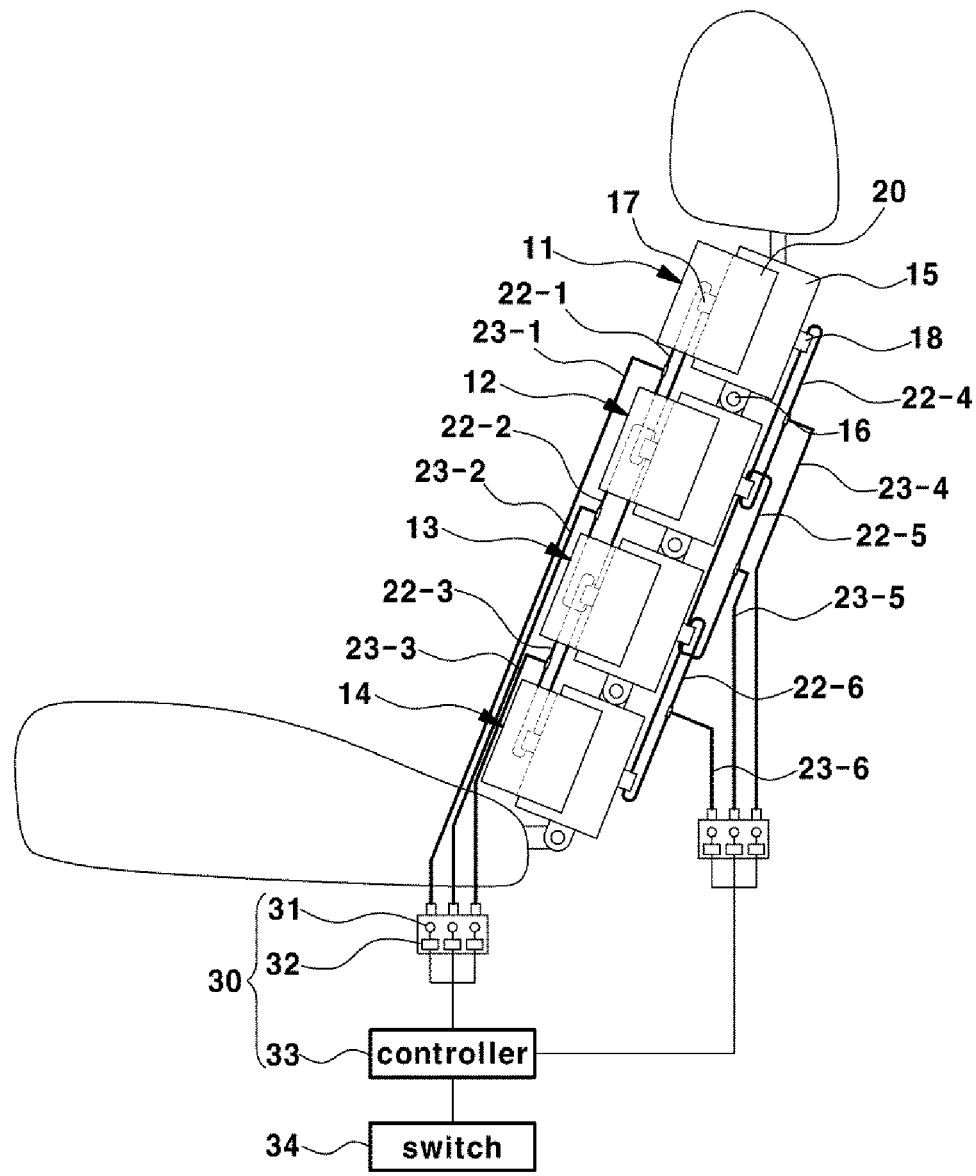

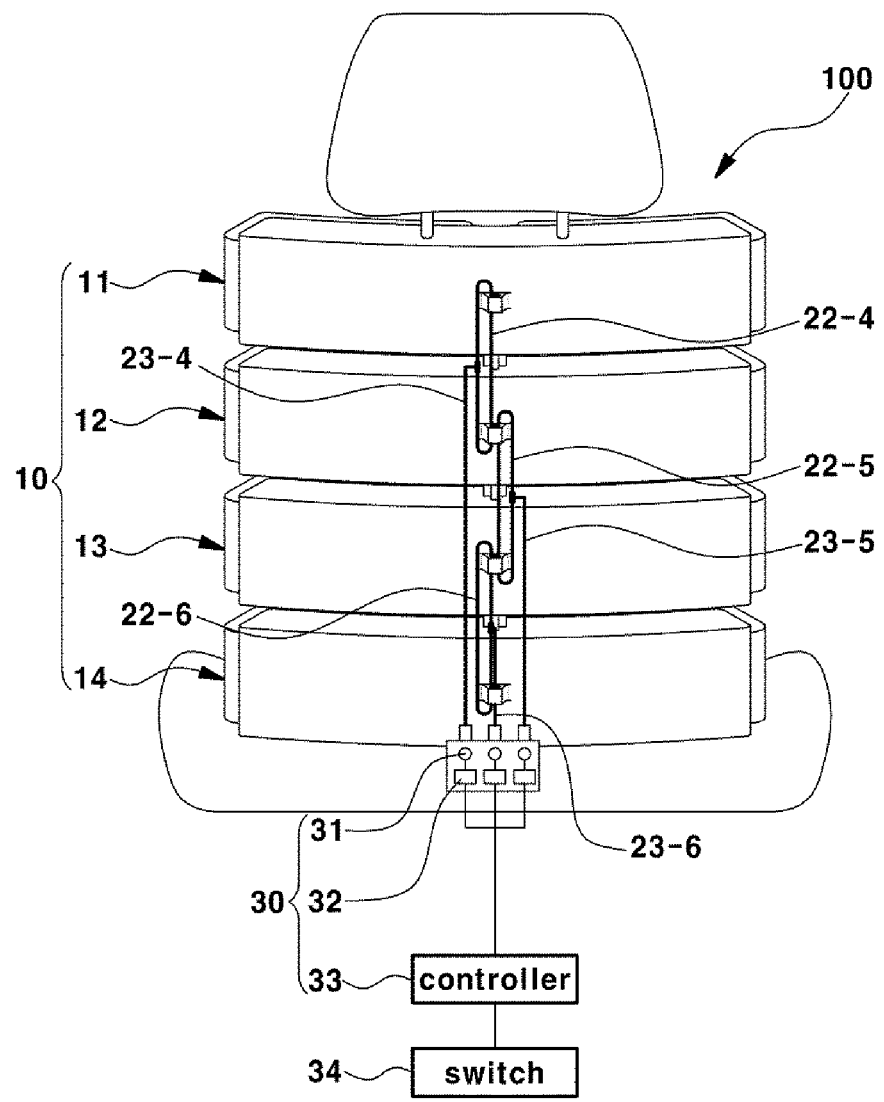

[FIG. 6]
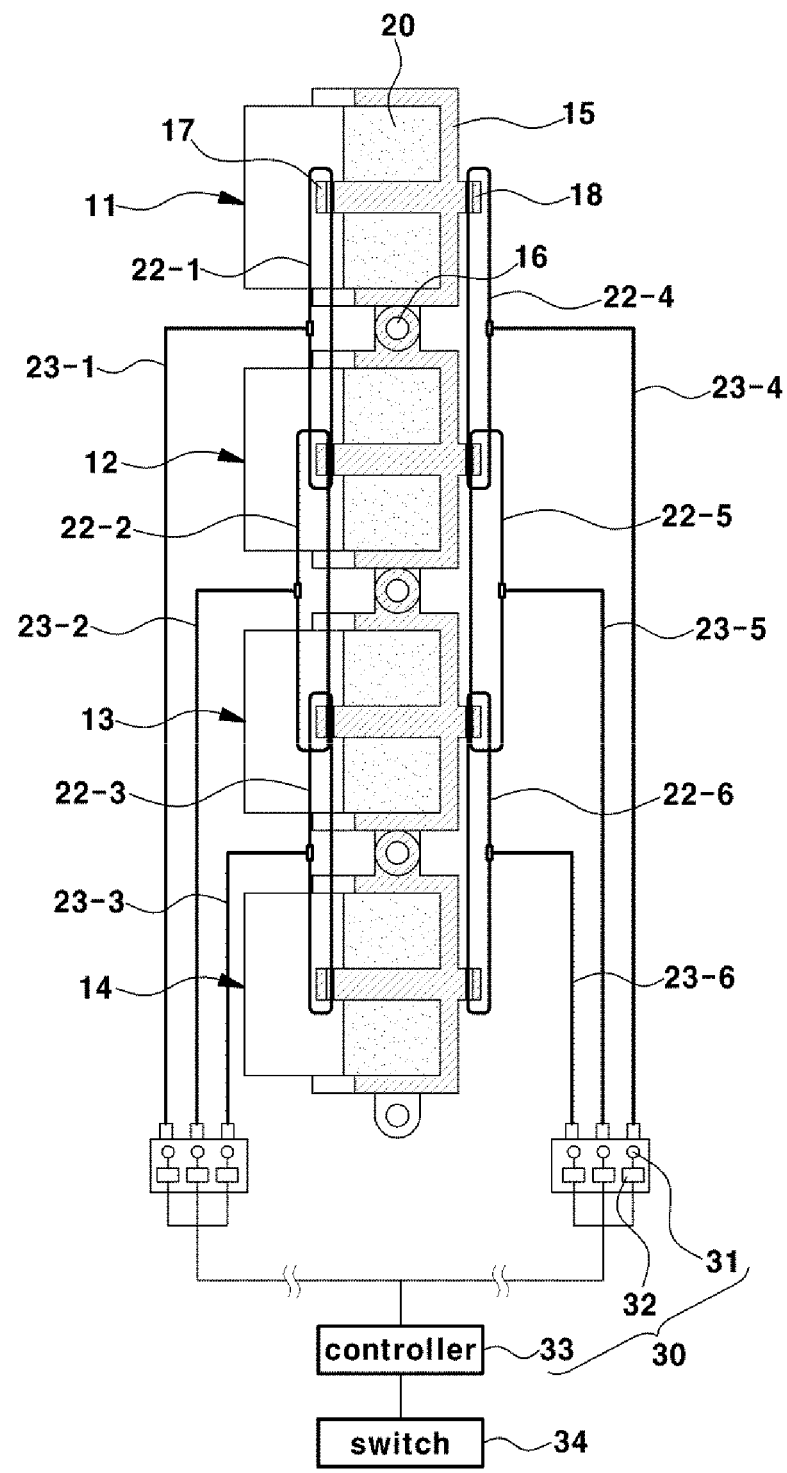

[FIG. 7]
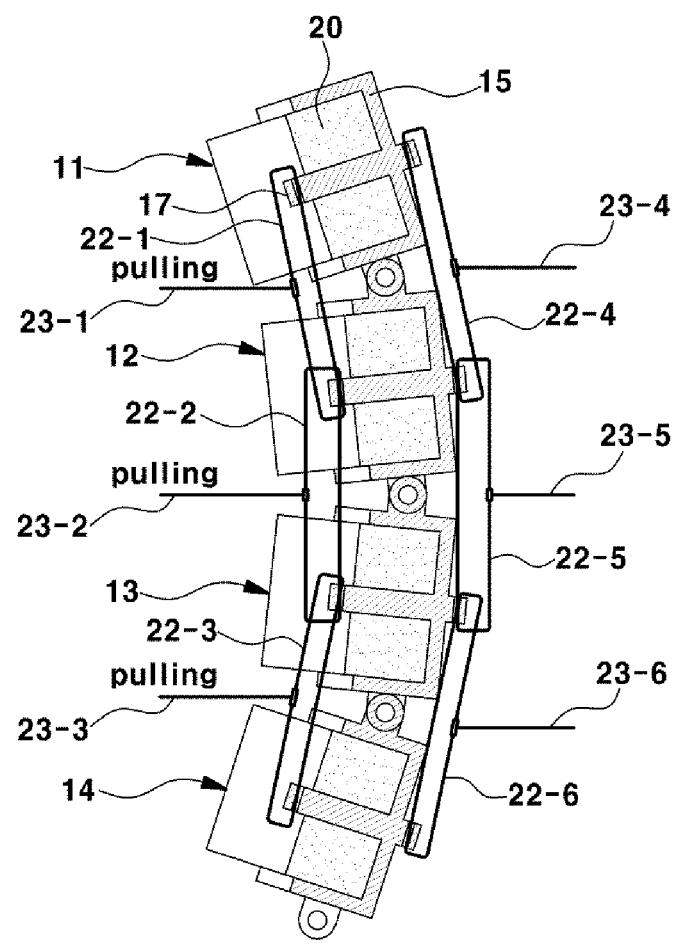

[FIG. 8]
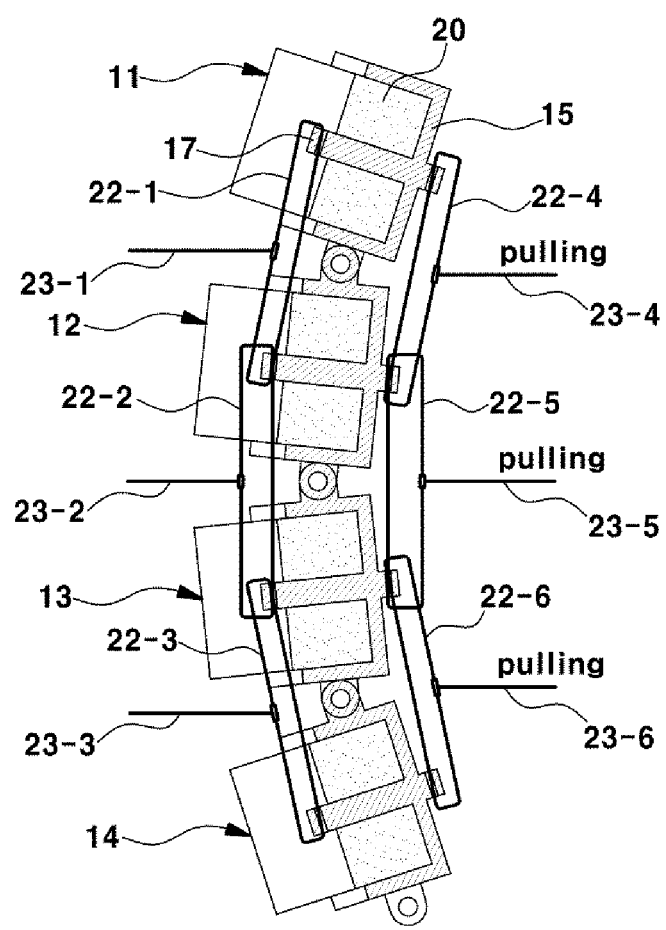

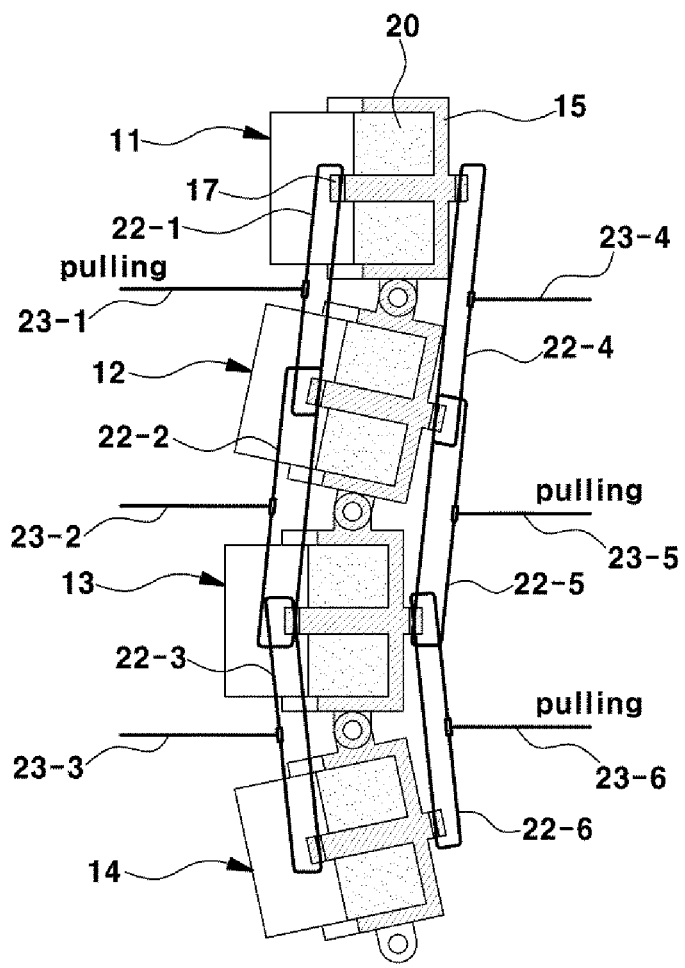
[FIG. 9]

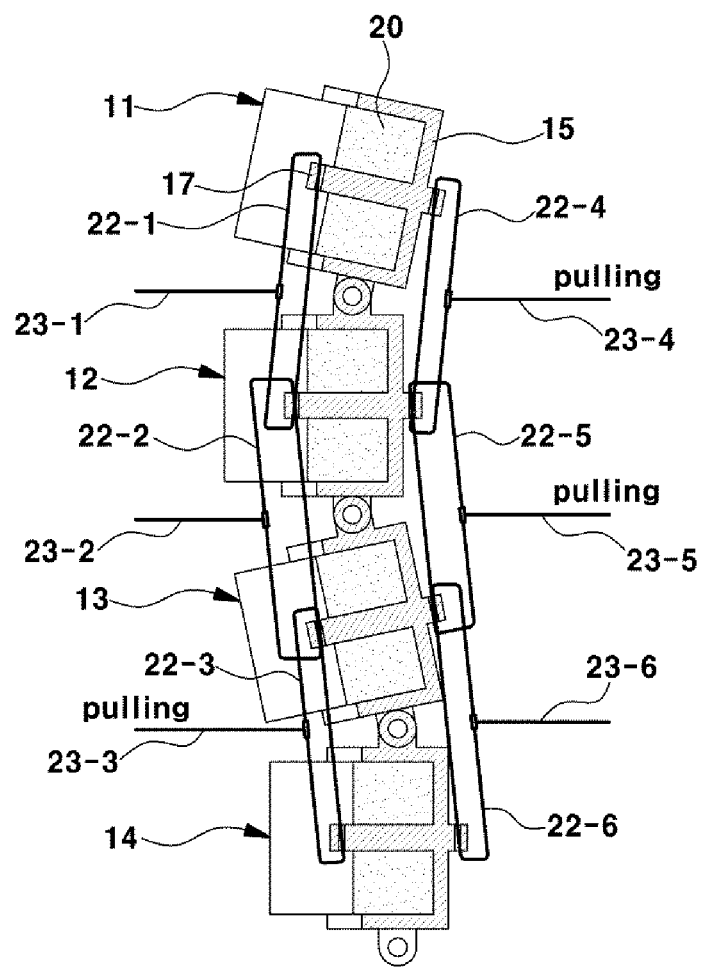
[FIG. 10]

– 1 –

MULTI-JOINT SEAT BACK FOR VEHICLE

CROSS-REFERENCE TO RELATED APPLICATION

This application claims the benefit and priority to Korean Patent Application No. 10-2018-0146974 filed on Nov. 26, 2018, the entire contents of which are incorporated herein by reference.

FIELD

The present disclosure relates to a multi-joint seat back for a vehicle and more particularly, to a multi-joint seat back for a vehicle that allows contour of the seat back to be adjusted to conform to the body shape of a passenger.

BACKGROUND

The statements in this section merely provide background information related to the present disclosure and may not constitute prior art.

An automobile seat may include a seat cushion for seating, a seat back for allowing the back to be reclined thereon and a headrest for supporting the neck and the head wherein a seat adjusting mechanism and various convenience mechanisms are provided inside and outside the seat.

In the case of a seat for an autonomous vehicle, it is desirable to make it possible for a passenger to take a desired posture for a break, sleep, etc. including multi-party conversation during long-distance driving.

Therefore, various convenience mechanisms such as a swivel mechanism, a seat tilting and reclining mechanism, a massage mechanism and the like may be applied to a seat for the autonomous vehicle.

Although such convenience mechanisms are installed in the seat, the shape of the seat back constituting the seat does not deviate from the basic shape for allowing the back of a passenger to be reclined on the seat back, which may result in an uncomfortable feeling to the passenger.

In other words, since most of the surface shapes of the seat back constituting the seat are formed in a single defined surface shape without consideration of different upper body shapes (especially, back portions) of passengers, reclining the back on the seat back does not satisfy all passengers.

The above information disclosed in this Background section is only for enhancement of understanding of the background of the disclosure and therefore it may contain information that does not form the prior art that is already known in this country to a person of ordinary skill in the art.

SUMMARY

The present disclosure describes a multi-joint seat back for a vehicle configured as a partitioned type seat back having a plurality of partitioned seat back components wherein angle of each partitioned seat back component is automatically adjusted in a forward or backward direction such that contour of an entire seat back can be adjusted so as to conform to the body shape of a passenger.

In one aspect of the present disclosure, there is provided a multi-joint seat back for a vehicle, comprising: a plurality of partitioned seat back components provided to have a structure in which a seat pad is inserted into a front portion of a skeletal frame and configured to be hinged to one another in a manner of rotating angularly in a forward or backward direction; elastic wires, each of which is connected between two partitioned seat back components selected from the plurality of partitioned seat back components; pulling wires bound to predetermined positions of the elastic wires respectively; and a drive unit connected to the pulling wires such that it winds the pulling wires to pull the elastic wires or otherwise releases the pulling wires to restore the elastic wires.

Particularly, the skeletal frame is characterized by having a structure in which hinge fastening ends are formed on the top and bottom faces respectively, a first wire joining bracket and a second wire joining bracket are formed on the front and rear faces respectively and a seat pad insertion space for inserting a seat pad is formed on the front portion.

The drive unit may be characterized by comprising pulleys for winding the pulling wires, motors coaxial with shafts of the pulleys respectively and a controller for controlling rotational drive amount of the motors.

In one variation, the controller is characterized by being connected to a mode switch for selective angle adjustment of each partitioned seat back component.

Further, the plurality of partitioned seat back components are characterized by being provided in four or more spaced apart from one another in a vertical direction so that they are hinged to one another so as to rotate angularly in a forward or backward direction.

Since the multi-joint seat back in the present disclosure has a plurality of partitioned seat back components and angle of each partitioned seat back component is automatically adjusted in the forward or backward direction, contour of an entire seat back comprising the partitioned seat back components can be adjusted so as to conform to the body shape of a passenger so that the passenger can take a desired resting or sleeping posture, thereby improving convenience and comfort feeling of a seat.

Other aspects of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The above and other features of the present disclosure will now be described in detail with reference to certain aspects thereof illustrated the accompanying drawings which are given hereinbelow by way of illustration only, and thus are not limitative of the present disclosure, and wherein:

FIG. 1 is an exploded perspective view of a partitioned seat back component of a multi-joint seat back for a vehicle according to an aspect of the present disclosure;

FIGS. 2A and 2B are perspective views illustrating an assembled state of a partitioned seat back component of a multi-joint seat back for a vehicle according to an aspect of the present disclosure;

FIG. 3 is a perspective view illustrating a fully assembled state of a multi-joint seat back for a vehicle according to an aspect of the present disclosure;

FIG. 4 is a side view illustrating an assembled state of a multi-joint seat back for a vehicle according to an aspect of the present disclosure;

FIG. 5 is a rear view illustrating an assembled state of a multi-joint seat back for a vehicle according to an aspect of the present disclosure;

FIG. 6 is a side section view illustrating an assembled state of a multi-joint seat back for a vehicle according to an aspect of the present disclosure; and FIGS. 7 to 10 are side section views illustrating action states of a multi-joint seat back for a vehicle according to an aspect of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter reference will now be made in detail to various aspects of the present disclosure, examples of which are illustrated in the accompanying drawings and described below. While the disclosure will be described in conjunction with exemplary aspects, it will be understood that present description is not intended to limit the disclosure to those exemplary aspects. On the contrary, the disclosure is intended to cover various alternatives, modifications, equivalents and other aspects, which may be included within the spirit and scope of the disclosure.

Aspects of the present disclosure will be described below in more detail with reference to the accompanying drawings.

In the accompanying drawings, FIG. 1 is an exploded perspective view of a partitioned seat back component of a multi-joint seat back for a vehicle according to an aspect of the present disclosure, FIGS. 2A and 2B are perspective views illustrating an assembled state of the partitioned seat back component of the multi-joint seat back for a vehicle according to the aspect of the present disclosure and FIG. 3 is a perspective view illustrating an assembled state in which every partitioned seat back components are assembled.

The seat back 100 according to this aspect of the present disclosure is provided to have a structure in which a plurality of partitioned seat back components 10 are hinged to one another so as to be angularly adjustable in a forward or backward direction.

Each of the partitioned seat back components 10 is configured to have a structure in which a seat pad 20 is inserted into a front portion of a skeletal frame 15.

Particularly, the skeletal frame 15 is configured to have a structure in which hinge fastening ends 16 are formed on the top and bottom faces respectively, a first wire joining bracket 17 and a second wire joining bracket 18 are formed on the front and rear faces respectively and a seat pad insertion space 19 for inserting a seat pad is formed on the front portion.

Accordingly, the partitioned seat back component 10 is accomplished by inserting the seat pad 20 into the seat pad insertion space 19 of the skeletal frame 15.

In this case, as shown in FIG. 2A, the first wire joining bracket 17 of the skeletal frame 15 passes through the central portion of the seat pad 20 and is exposed forward.

More specifically, the central portion of the seat pad 20 is formed to be thinner than both side portions of the seat pad to form a concave groove 21 as viewed from the front wherein the first wire joining bracket 17 of the skeletal frame 15 is formed to protrude through the concave groove 21.

Preferably, an elastic wire and a pulling wire are fastened to the first wire joining bracket 17 as described later and then a predetermined cover material (not shown) is mounted in the concave groove 21 of the seat pad 20.

The partitioned seat back components 10 configured as described above are hinged to one another so as to be rotatable angularly in the forward or backward direction in a state where four or more partitioned seat back components are arranged to be spaced apart from one another in a vertical direction and, as a result, assembled into a seat back 100 on which the passenger can recline.

For example, each of the elastic wires 22-1, 22-2, 22-3, 22-4, 22-5 and 22-6 is joined and connected between the two partitioned seat back components 10 selected from the plurality of partitioned seat back components 10 wherein pulling wires capable of pulling the elastic wires hound to predetermined positions of the elastic wires 22-1, 22-2, 22-3, 22-4, 22-5 and 22-6, respectively.

Further, a drive unit 30 is connected to the pulling wires 23-1, 23-2, 23-3, 23-4, 23-5 and 23-6. This drive unit 30 serves to wind the pulling wires 23-1, 23-2, 23-3, 23-4, 23-5 and 23-6 to pull the elastic wires 22-1, 22-2, 22-3, 22-4, 22-5 and 22-6, or otherwise release the pulling wires 23-1, 23-2, 23-3, 23-4, 23-5 and 23-6 such that the elastic wires 22-1, 22-2, 22-3, 22-4, 22-5 and 22-6 are restored by elastic restoring force.

Preferably, the drive unit 30 is mounted at a predetermined position on a floor panel of the vehicle. This drive unit comprises pulleys 31 for winding the pulling wires 23-1, 23-2, 23-3, 23-4, 23-5 and 23-6; motors 32 coaxial with shafts of the pulleys 31 respectively; and a controller 33 for controlling rotational drive amount of the motors 32 wherein the controller 33 is connected to a user-operable mode switch 34 for selective angle adjustment of each partitioned seat back components 10.

Hereinafter, in order to facilitate understanding of the present disclosure, description will be made by referring to an aspect in which a total of four partitioned seat back components such as a first partitioned seat back component 11, a second partitioned seat back component 12, a third partitioned seat back component 13 and a fourth partitioned seat back component 14 are hinged to one another and assembled together.

In the accompanying drawings, FIGS. 4 and 5 are side and rear views illustrating an assembled state of a multi-joint seat back for a vehicle according to an aspect of the present disclosure respectively and FIG. 6 is a side section view illustrating an assembled state of a multi-joint seat back for a vehicle according to an aspect of the present disclosure.

As can be seen from FIGS. 4 to 6, a partition type seat back of this aspect may be provided in such a manner that a total of four partitioned seat back components such as a first partitioned seat back component 11, a second partitioned seat back component 12, a third partitioned seat back component 13 and a fourth partitioned seat back component 14 are hinged to one another and assembled together.

In other words, hinge fastening ends 16 formed on the skeletal frames 15 of the first to fourth partitioned seat back components 11, 12, 13 and 14 are hinged mutually and as a result a total of four partitioned seat back components such as the first partitioned seat back component 11, the second partitioned seat back component 12, the third partitioned seat back component 13 and the fourth partitioned seat back component 14 are assembled together in such a manner that angles of them can be adjusted in the forward or reward direction.

Preferably, the first elastic wire 22-1 is joined between the first wire joining bracket 17 of the skeletal frame 15 of the first partitioned seat back component 11 and the first wire joining bracket 17 of the skeletal frame 15 of the second partitioned seat back component 12, the second elastic wire 22-2 is joined between the first wire joining bracket 17 of the skeletal frame 15 of the second partitioned seat back component 12 and the first wire joining bracket 17 of the skeletal frame 15 of the third partitioned seat back component 13, and the third elastic wire 22-3 is joined between the first wire joining bracket 17 of the skeletal frame 15 of the third partitioned seat back component 13 and the first wire joining bracket 17 of the skeletal frame 15 of the fourth partitioned seat back component 14.

In this case, the first to third pulling wires 23-1, 23-2 and 23-3 are bound to the first to third elastic wires 22-1, 22-2 and 22-3 respectively.

Further, the fourth elastic wire 22-4 is joined between the second wire joining bracket 18 of the skeletal frame 15 of the first partitioned seat back component 11 and the second wire joining bracket 18 of the skeletal frame 15 of the second partitioned seat back component 12, the fifth elastic wire 22-5 is joined between the second wire joining bracket 18 of the skeletal frame 15 of the second partitioned seat back component 12 and the second wire joining bracket 18 of the skeletal frame 15 of the third partitioned seat back component 13, and the sixth elastic wire 22-6 is joined between the second wire joining bracket 18 of the skeletal frame 15 of the third partitioned seat back component 13 and the second wire joining bracket 18 of the skeletal frame 15 of the fourth partitioned seat back component 14.

In this case, the fourth to sixth pulling wires 23-4, 23-5 and 23-6 are bound to the fourth to sixth elastic wires 22-4, 22-5 and 22-6 respectively.

On the other hand, the first to third pulling wires 23-1, 23-2 and 23-3 and the fourth to sixth pulling wires 23-4, 23-5 and 23-6 are wound around and fixed to the above-mentioned pulleys 31 of the drive unit 30 respectively.

Hereinafter, action state of the partitioned seat back components as mentioned above will be discussed.

Referring to FIG. 7, when the user selects a first mode of the mode switch 34 and thus the motors 32 of the drive unit 30 are driven to rotate and simultaneously winding action of the pulleys 31 is performed and simultaneously the first to third pulling wires 23-1, 23-2 and 23-3 are pulled, the first to third elastic wires 22-1, 22-2 and 22-3 are pulled.

Next, as the first to third elastic wires 22-1, 22-2 and 22-3 are pulled, the first partitioned seat back component 11 and the second partitioned seat back component 12 rotate angularly forward together, the second partitioned seat back component 12 and the third partitioned seat back component 13 rotate angularly forward together and the third partitioned seat back component 13 and the fourth partitioned seat back component 14 rotate angularly forward together, so that the first to fourth partitioned seat back components 11, 12, 13 and 14 assume a configuration curved concavely toward the front as a whole, as shown in FIG. 7.

Referring to FIG. 8, when the user selects a second mode of the mode switch 34 and thus the motors 32 of the drive unit 30 are driven to rotate and simultaneously winding action of the pulleys 31 is performed and simultaneously the fourth to sixth pulling wires 23-4, 23-5 and 23-6 are pulled, the fourth to sixth elastic wires 22-4, 22-5 and 22-6 are pulled.

Next, as the fourth to sixth elastic wires 22-4, 22-5 and 22-6 are pulled, the first partitioned seat back component 11 and the second partitioned seat back component 12 rotate angularly backward together, the second partitioned seat back component 12 and the third partitioned seat back component 13 rotate angularly backward together and the third partitioned seat back component 13 and the fourth partitioned seat back component 14 rotate angularly backward together, so that the first to fourth partitioned seat back components 11, 12, 13 and 14 assume a configuration curved convexly toward the front as a whole, as shown in FIG. 8.

Referring to FIG. 9, when the user selects a third mode of the mode switch 34 and thus the motors 32 of the drive unit 30 are driven to rotate and simultaneously winding action of the pulleys 31 is performed and simultaneously the first pulling wire 23-1 and the fifth and sixth pulling wires 23-5 and 23-6 are pulled, the first elastic wire 22-1 and the fifth and sixth elastic wires 22-5 and 22-6 are pulled.

Next, the first partitioned seat back component 11 and the second partitioned seat back component 12 rotate angularly forward together while the third partitioned seat back component 13 and the fourth partitioned seat back component 14 rotate angularly backward together, so that the first and second partitioned seat back components 11 and 12 assume a configuration curved concavely toward the front while the third and fourth partitioned seat back components 13 and 14 assume a configuration curved convexly toward the front, as shown in FIG. 9.

Referring to FIG. 10, when the user selects a fourth mode of the mode switch 34 and thus the motors 32 of the drive unit 30 are driven to rotate and simultaneously winding action of the pulleys 31 is performed and simultaneously the third pulling wire 23-3 and the fourth and fifth pulling wires 23-4 and 23-5 are pulled, the third elastic wire 22-3 and the fourth and fifth elastic wires 22-4 and 22-5 are pulled.

Next, the first partitioned seat back component 11 and the second partitioned seat back component 12 rotate angularly backward together while the third partitioned seat back component 13 and the fourth partitioned seat back component 14 rotate angularly forward together, so that the first and second partitioned seat back component 11 and 12 assume a configuration curved convexly toward the front while the third and fourth partitioned seat back component 13 and 14 assume a configuration curved concavely toward the front, as shown in FIG. 10.

As described above, contour of an entire seat back can be adjusted so as to conform to the body shape (back portion) of a passenger by selectively adjusting angles of the first to fourth partitioned seat back components 11, 12, 13 and 14, so that the passenger can take a desired resting or sleeping posture. Therefore, the multi-joint seat back in the present disclosure improves convenience and comfort feeling of a seat.

The disclosure has been described in detail with reference to preferred aspects thereof. However, it will be appreciated by those skilled in the art that changes may be made in these aspects without departing from the principles and spirit of the disclosure.

The invention claimed is:

1. A multi-joint seat back for a vehicle, comprising:

A skeletal frame;

a plurality of partitioned seat back components attached to the skeletal frame;

each of the plurality of partitioned seat back components configured to receive a seat pad;

each of the plurality of partitioned seat back components inserted into a front portion of the skeletal frame and configured to be hinged to one another for angular rotation in a forward or backward direction;

a plurality of elastic wires, each of which is connected between two adjacent partitioned seat back components selected from the plurality of partitioned seat back components;

a plurality of pulling wires, wherein the pulling wires are bound to predetermined positions of the elastic wires, respectively; and a drive unit connected to the pulling wires such that the drive unit winds the pulling wires to pull the elastic wires or release the pulling wires to restore the elastic wires.

2. The multi-joint seat back of claim 1, wherein the skeletal frame comprises front and rear faces and top and bottom faces on which hinge fastening ends are formed, a first wire joining bracket and a second wire joining bracket are formed on the front and rear faces, respectively.

3. The multi-joint seat back of claim 2, wherein the plurality of partitioned seat back components of the skeletal frame comprises a seat pad insertion space on a front portion for inserting the seat pads.

4. The multi-joint seat back for a vehicle of claim 1, wherein the drive unit comprises pulleys connected to and for winding the pulling wires, motors coaxial with and attached to shafts of the pulleys, respectively, and a controller for controlling a rotational drive amount of the motors.

5. The multi-joint seat back for a vehicle of claim 4, wherein the controller is connected to a mode switch for selective angle adjustment of each partitioned seat back component.

6. The multi-joint seat back for a vehicle of claim 1, wherein the plurality of partitioned seat back components comprise four or more partitioned seat back components spaced apart from one another in a vertical direction so that they are hinged to one another to rotate angularly in a forward or backward direction.

* * * * *